United States Patent [19]

Dantowitz et al.

[11] 3,926,020

[45] Dec. 16, 1975

[54] VEHICLE AUTOMATIC TRANSMISSION BICYCLE WITH ALTERNATE FIXED RATIO OR VARIABLE RATIO SPEED SENSITIVE POWER PATHS

[76] Inventors: Philip Dantowitz, 39 Nancy Ave., Peabody, Mass. 01960; William A. Holmes, 7 Bradlee Road, Marblehead, Mass. 01945

[22] Filed: Jan. 9, 1974

[21] Appl. No.: 431,953

[52] U.S. Cl. .. 74/217 B; 74/230.17 F; 74/230.17 A; 280/238; 74/336; 74/722
[51] Int. Cl.² .................. F16H 55/22; F16H 11/04
[58] Field of Search ............ 74/230.17 A, 230.17 R, 74/230.17 B, 230.17 C, 230.17 F, 217 B, 217 CV, 722, 230.17 E, 217 R; 180/33 B; 280/236, 238, 261

[56] References Cited
UNITED STATES PATENTS

| | | |
|---|---|---|
| 644,411 | 2/1900 | Deafenbaugh ...................... 280/238 |
| 2,731,849 | 1/1956 | Rockwood et al. .......... 74/230.17 F |
| 3,146,633 | 9/1964 | Schmitter et al. ..................... 74/745 |
| 3,731,549 | 5/1973 | Kaiser et al. ................. 74/230.17 F |
| 3,747,721 | 7/1973 | Hoff ................................. 180/33 B |
| 3,782,210 | 1/1974 | Holleman ........................... 280/236 |
| 3,837,234 | 9/1974 | Chao ........................... 74/230.17 A |

*Primary Examiner*—Samuel Scott
*Assistant Examiner*—Allan R. Burke
*Attorney, Agent, or Firm*—Lawrence G. Norris

[57] ABSTRACT

An automatic transmission for vehicles in which the speed ratio of the transmission is automatically adjusted in response to a control signal which is generated as a function of the speed of the drive system of the vehicle.

22 Claims, 3 Drawing Figures

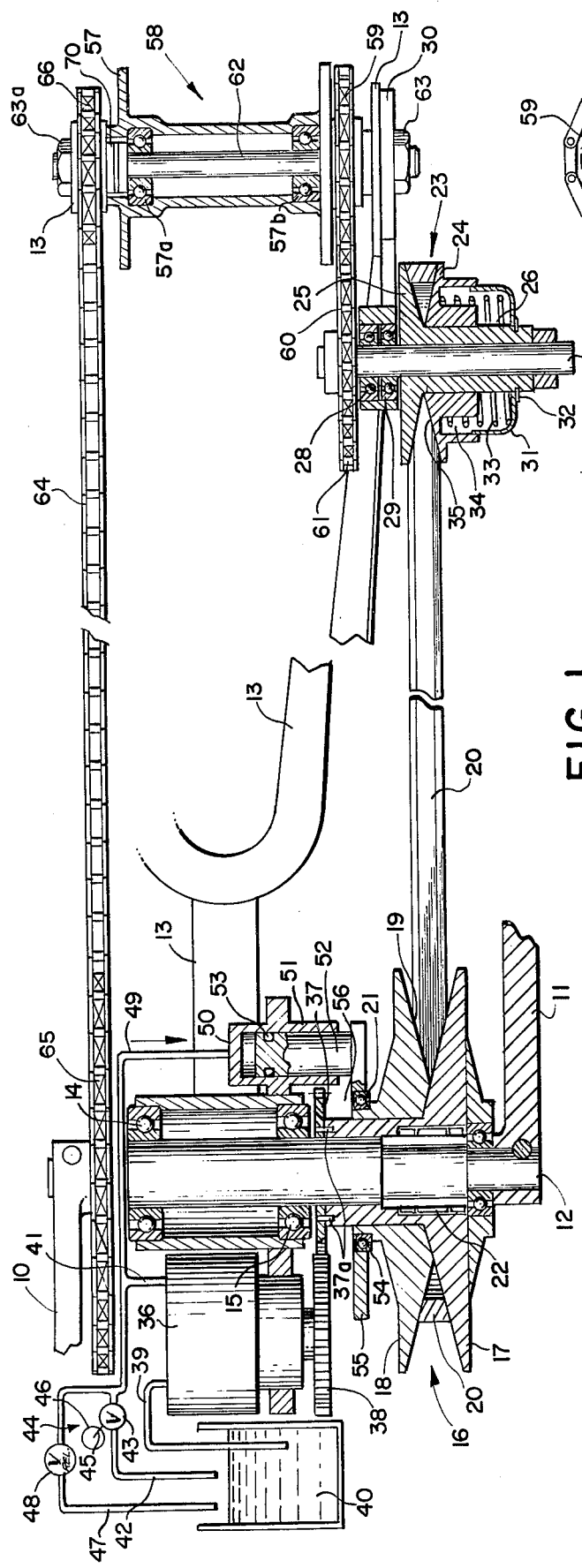
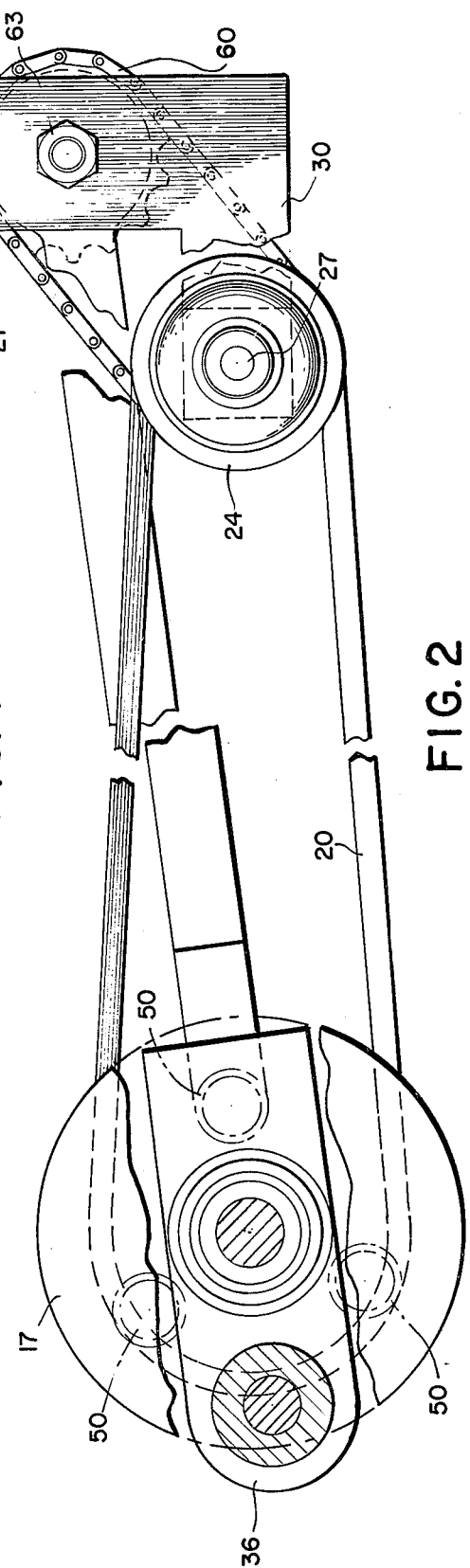
FIG. 1
FIG. 2

VEHICLE AUTOMATIC TRANSMISSION BICYCLE WITH ALTERNATE FIXED RATIO OR VARIABLE RATIO SPEED SENSITIVE POWER PATHS

BACKGROUND OF THE INVENTION

1. Field of the Invention

The present invention relates to the field of automatic vehicle transmissions and is particularly suited to vehicles requiring relatively low propulsion power, such as bicycles, motorcycles, snowmobiles, lawnmowers, and the like. As applied to a manually powered bicycle, the transmission automatically adjusts the speed ratio between the operator driven pedals and the bicycle drive wheel in response to a control signal that is derived as a function of drive wheel speed or pedal drive speed.

2. Description of the Prior Art

In the typical transmission for vehicles of the type under discussion, to use bicycles as an example, the speed ratio between operator pedal speed and drive wheel speed is either fixed or is adjusted manually in fixed increments by the operator in response to his subjective determination of the speed ratio desired under the particular operating conditions. Each setting of the transmission provides a different, fixed speed ratio so that it is necessary for the operator frequently to shift manually from one speed ratio to another as operating conditions vary.

The complexity of such transmissions increases as the number of speed ratio settings is increased. Typical systems presently available range from the relatively simple three speed transmission to the more complex fifteen speed system.

Transmissions of the type just described provide only a single speed ratio for any given setting and are incapable of providing speed ratios in between the incremental steps established by the fixed settings. In addition, the operator must sense when a change in speed ratio is desired and then manually shift from one setting to another until a comfortable ratio is found.

Unless the operator is particularly adept in the manipulation of such systems, difficulties can arise in operation, particularly in the case of the more complex systems having a large number of settings. To give just one example, suppose an operator is ascending a hill and has the transmission set at a high ratio of pedal speed to wheel speed. When he arrives at the top of the hill, he will begin to coast down and when he does so will usually allow the pedals to remain in a stationary position. As he approaches the bottom of the hill, the vehicle will have gained considerable speed and if the operator now tries to resume pedaling, he will find, if he has not readjusted the transmission from the uphill setting, that the pedals will suddenly rotate very loosely and at a high rotational speed, a sensation that can be both startling and uncomfortable. In order to find the proper speed ratio, the operator must now shift the transmission manually in an attempt to find a comfortable setting, a procedure that may require several cut and try attempts and that can be exasperating and frustrating to an unskilled operator.

Most users of bicycles today are not particularly proficient in the use of multi-speed transmissions and in many cases do not possess the aptitude or the desire to become adept in the operation of such systems. Rather, they prefer the recreational aspects of bicycle use and do not want to be particularly concerned with the mechanical complexities of the vehicle. Similar considerations apply in other light vehicles now in widespread use by the general public such as snowmobiles, motorcycles, lawnmowers and the like.

It is accordingly a primary object of this invention to provide an improved automatic transmission for vehicles in which the speed ratio is automatically adjusted without the need for operator intervention and in response to a control signal derived as a function of a speed parameter of the system.

SUMMARY OF THE INVENTION

Briefly described, the invention contemplates, in one form thereof, an infinitely variable speed ratio transmission in which the speed ratio is adjusted automatically in response to a control signal derived in a manner hereinafter described in further detail. In the embodiment herein presented, as applied to a bicycle, a control signal is generated as a function of pedal drive speed which is in turn a function of drive wheel speed. The speed ratio of the transmission is controlled automatically over the established operating range by the control signal as a function of pedal drive speed. The system in one embodiment is provided with a unique overrunning capability at both the upper and lower operating speed ratio limits to yield particularly important advantages as will be apparent from the description which follows. These advantages together with other unique features and advantages of this invention will be described in detail in the specification below.

BRIEF DESCRIPTION OF THE DRAWINGS

FIG. 1 is a plan view, shown partly in cross section and partly in schematic form, of a bicycle drive system embodying the present invention;

FIG. 2 is a side view of the drive system of FIG. 1; and

DESCRIPTION OF PREFERRED EMBODIMENTS

Figure 3:
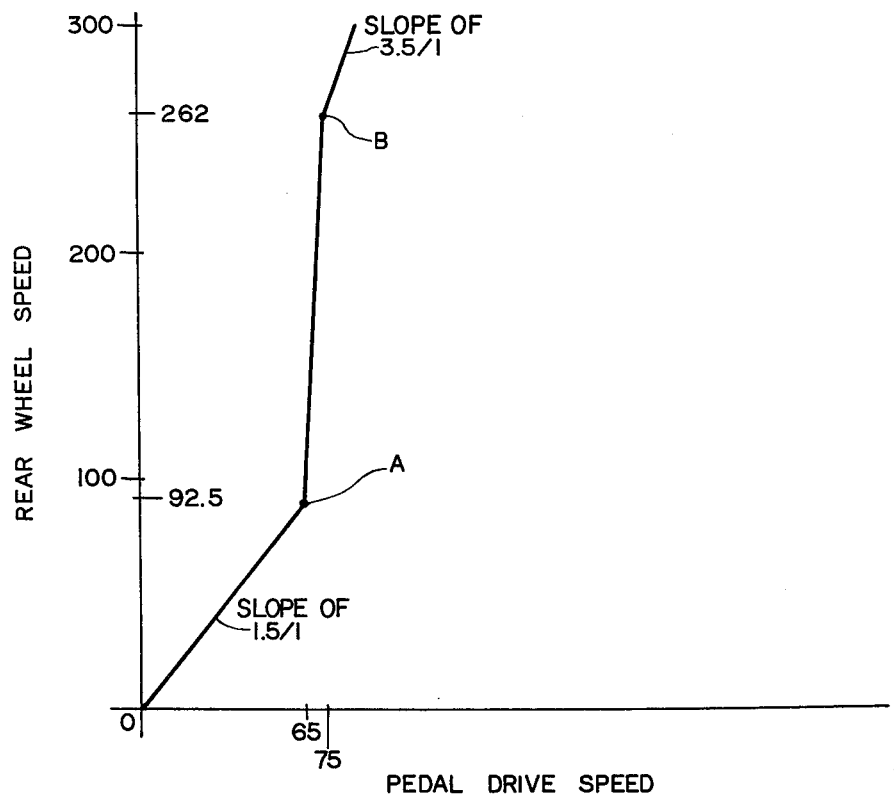
FIG. 3 is a graphic representation of a typical relationship between transmission speed ratio and bicycle pedal and wheel speeds for the drive system of FIGS. 1 and 2.

Referring now to FIGS. 1 and 2, there is illustrated a bicycle drive system embodying the present invention. While the particular embodiment shown in the drawings relates to bicycle applications, it should be understood, as will become apparent, that the invention has application to other forms of vehicles.

In the embodiment shown in FIGS. 1 and 2, the system is adapted to be driven by the operator through foot pedal shafts 10 and 11 which are connected to conventional foot pedals (not shown). The shafts 10 and 11 are secured in driving relationship to input drive shaft means 12 through which input propulsion power is received into the drive system. The drive shaft 12 is rotatably supported in the bicycle frame 13 on bearings 14 and 15.

Mounted on the input drive shaft 12 are first transmission means 16 which, in the embodiment illustrated, comprise a pair of discs 17 and 18 concentrically arranged in face to face relationship to form therebetween a V-shaped (in cross section) cylindrical passage 19 for receiving an endless, flexible power transmitting element here illustrated in the form of a belt 20.

The disc 17 includes an axially extending cylindrical portion 21 on which the second disc 18 is mounted. The disc 18 is secured on disc 17 against rotational movement relative thereto but is free to move axially on the cylindrical portion 21. This is accomplished by means of an axially extending keyway and key connection (not shown) between disc 18 and cylindrical portion 21 or in any other well known manner. Thus, discs 17 and 18 are secured together for rotational movement but are free to slide axially in relation to each other.

The driving connection between input drive shaft 12 and disc 17 is through an overrunning clutch 22 which permits driving in one direction and overruns in the opposite direction. Thus, the operator can allow the pedals to remain at rest while the bicycle is in motion with the drive system overrunning the input drive shaft 12 through the overrunning clutch 22.

The belt 20 forms a driving interconnection between the first transmission means 16 and a second transmission means 23 comprising a pair of discs 24 and 25 similar to discs 17 and 18. Depending on the design parameters chosen, the discs 24 and 25 may be either the same or different diameters than the discs 17 and 18. Disc 25 includes an elongated cylindrical portion 26 on which disc 24 is mounted, again being secured against rotational movement relative to disc 25 but free to slide axially on cylindrical portion 26 and relative to disc 25.

Cylindrical portion 26 is secured in driving relationship to a shaft 27 and the entire assembly comprising discs 24 and 25 and shaft 27 is mounted for rotational movement in a pair of bearings 28 and 29 which are in turn mounted in a support bracket 30.

Mounted on disc 24 is a cap 31 which is secured to cylindrical portion 26 by means of snap ring 32 and which houses a spring 33. The spring 33 extends into an annular groove 34 in disc 24 and resiliently urges disc 24 into face to face engagement with disc 25, whereby there is formed there-between a V-shaped cylindrical passage 35 for receiving in driving relationship the power transmitting belt 20.

The resiliently applied force of the spring 33 provides for automatic adjustment of the effective diameter of engagement of the V-shaped passage 35 with the belt 20. In other words, as belt tension increases the discs 24 and 25 are forced apart against the load of spring 33 to provide a reduced diameter of engagement between the belt 20 and the passage formed by discs 24 and 25. Similarly, as belt tension is decreased, the spring force moves the discs 24 and 25 closer together to increase the diameter of engagement.

It will now be observed that the speed ratio between the first transmission means 16 and the second transmission means 23 is determined by the ratio of the diameters of engagement of the belt 20 in the V-shaped passages 19 and 35 formed respectively by discs 17 and 18 and by discs 24 and 25. As has been just explained the diameter of engagement of the second transmission means 23 is controlled by the spring 33 as a function of the tension in the belt 20. The diameter of engagement of first transmission means 16 is controlled as a function of a speed responsive signal in a manner now to be described.

In order to provide for automatic adjustment of the speed ratio between the first and second transmission means 16 and 23, means are provided for generating a control signal as a function of a selected speed parameter of the system. In the embodiment shown in the drawings, such means comprise a hydraulic fluid pump 36 suitably mounted on the bicycle frame and connected to be driven by a gear element 37, secured by pins 37a to the end of cylindrical portion 21, and engaging an input drive gear 38 on the pump.

The pump connections are shown in schematic form and comprise an input line 39 extending into a hydraulic reservoir 40 and a discharge line 41 through which hydraulic fluid under pressure is discharged from the pump. Flow back to the reservoir is normally through line 42 which includes in it a flow restricting orifice valve 43. The flow restricting orifice valve 43 may be of any well known type but, for reasons to be explained, it preferably incorporates means 44 for manually adjusting the effective area of the orifice. This is shown schematically in the form of a shaft 45 connected to a knob 46 suitably mounted on the bicycle frame so that the operator can adjust the effective area of the orifice in the valve 43.

Connected to provide a parallel return path back to the reservoir 40 is a line 47 in which is mounted a pressure relief valve 48 is set to release at a pressure substantially above normal operating pressures and provides means for limiting the maximum pressure in the system by bypassing flow back to reservoir 40 when the set pressure limit is reached.

Control pressure is derived from the pump 36 through an output line 49 connected to symmetrically arranged actuators 50, only one of which is shown in FIG. 1. The actuators 50, which may conveniently be three in number and circumferentially equally spaced from each other, comprise in each case a cylinder 51 in which is slidably mounted a piston 52. The line 49 is connected to supply hydraulic fluid under pressure to the cylinders 51 and thereby apply an actuating pressure to the pistons 52. Suitable O-ring seals 53 may be provided to prevent leakage past the pistons.

Mounted on a cylindrical portion 56 of disc 18 by means of a bearing 54 is an actuator plate 55 which is engaged by the pistons 52. The actuator plate 55 does not rotate with the discs 17 and 18 but through the bearing 54 transmits the actuating force generated by pistons 52 to the disc 18. Thus, an increase in control pressure in line 49 increases the force generated by the pistons 52 resulting in an increase in the force on the actuator plate 55 and thereby causing the disc 18 to move toward disc 17 to increase the diameter of engagement with the belt 20. On the other hand, a decrease in control pressure in line 49 and a resulting decrease in the actuating forces just described allows disc 18 to move away from disc 17 under the influence of forces resulting from belt tension so that a decreased diameter of engagement with the belt 20 results. At the same time the second transmission means 23 responds in the manner already described to adjust the diameter of engagement of belt 20 in passage 35. A complete operating sequence will be presented below.

As has been pointed out, the pump 36 is driven at a speed proportional to the speed of the first transmission means 16. The pump 36 is preferably of the fixed displacement type so that discharge through the flow restricting orifice valve 43 results in a pressure in line 49 which is proportional to pump speed and in turn proportional to the speed of first transmission means 16. The control pressure signal is also a function of the speed of the bicycle drive wheel by reasons of the interconnection between the first transmission means and the drive wheel, an important relationship which will be more fully described below.

Referring now again to the second transmission means 23, which as described earlier is mounted on bracket 30, the interconnection between the second transmission means and the bicycle drive wheel will now be described. Only the hub portion 57 of the bicycle drive wheel 58 is illustrated, the remaining construction of the wheel being well known. The hub portion 57 of the bicycle drive wheel 58 is mounted on a fixed, frame supported shaft 62 by means of bearings 57a and 57b. The shaft 62 is secured to frame 13 by means of a nut 63 at one end and a nut 63a at the other. The nut 63 also secures the bracket 30 to the frame 13.

Mounted on the drive wheel hub 57 is a gear element 59 connected to be driven through an endless chain 60 from a gear element 61 mounted on the shaft 27 of the second transmission means 23. As indicated above, the bracket 30, on which second transmission means 23 are mounted, is secured to the frame 13 by means of a lock nut 63. With the lock nut 63 loosened, the bracket 30 may be rotated on the shaft 62 to adjust the desired initial tension in the belt 20. Upon making this adjustment, the lock nut 63 is tightened and the bracket 30 is thus locked in place during operation of the system.

In one embodiment of the invention, a second power transmission path is provided in parallel with that formed by the first and second transmission means and the interconnecting belt 20. In the embodiment illustrated in FIGS. 1 and 2, the second power transmission path comprises an endless chain 64 interconnecting a pair of gear elements 65 and 66. The gear element 65 is secured to the pedal driven shaft 12 and the gear element 66 is secured to the hub 57 of the bicycle drive wheel 58. The speed ratio between pedal drive speed and bicycle drive wheel speed through the path formed by elements 65 and 66 and interconnecting chain 64 is fixed by the relative diameters of the gear elements 65 and 66 and is chosen so that it is close to or equal to the maximum speed ratio achievable through the automatically adjustable transmission.

To explain this further, consider the condition where the bicycle is stationary or moving very slowly. Under these conditions, the discs 17 and 18 will be at or near the maximum available distance apart from each other and the diameter of engagement of the belt 20 with the passage 19 will be at or near the minimum which the system can produce. This means that more pedal revolutions are required to produce a given drive wheel speed and hence we refer to this condition as the maximum speed ratio. Here the ratio is pedal speed to drive wheel speed.

Under the conditions just described where the bicycle is at standstill or operating at a very low speed, say on a steep grade, the operator is usually inclined to apply a high pedaling force to either increase or maintain speed. Under such a high torque condition, there is a correspondingly high tangential force exerted by the first transmission means on the belt 20 and, depending on the coefficient of friction between the belt and the engaged surfaces of the discs 17 and 18, there may be a tendency for the belt to slip relative to the discs. Under these conditions, as will be explained in further detail below, the fixed speed ratio path through gear elements 65 and 66 and chain 64 becomes predominant and driving power is transmitted entirely through the fixed speed ratio path.

This predominance is established in the embodiment shown by means of an overrunning clutch 70 which interconnects gear elements 66 and hub 57. As long as the rotational speed of the drive wheel hub 57 as established through the variable speed ratio transmission is greater than the rotational speed of the gear element 66 as established through the chain 64, the hub 57 will overrun the gear element 66 and the fixed speed path established by the chain 64 will remain ineffective. However, if the driven speed of the hub 57 as established through the variable speed ratio falls below that which the fixed ratio path through the chain 64 seeks to establish, the overrunning clutch 70 takes hold and establishes the drive power path through the chain 64, gear element 66 and clutch 70 to the hub 57.

The point at which the clutch 70 takes hold to establish predominance of the fixed ratio path is determined by the fixed speed ratio because for all pedal to hub speed ratios greater than the fixed speed ratio the speed of the hub 57 which the variable ratio path will attempt to establish will be less than the speed of the hub 57 as determined by the fixed ratio path and hence the fixed ratio path will predominate through the overrunning clutch 70.

As long as the system remains in the fixed ratio mode under conditions as just described, the transmission means 23 will drive the transmission means 16 through the belt 20 at a rotational speed greater than that of the pedals and hence the transmission means 16 will overrun the pedal shaft 12 through the overrunning clutch 22. Since the pump drive gear 37 is connected to the transmission means 16, the pump will also be driven at the speed established by the transmission means 16, in other words also overrunning the pedals.

For a further description of the operation of the system, reference will now be had to the speed relationships shown in FIG. 3. It should be noted here that FIG. 3 sets forth a typical speed relationship selected for purposes of describing the system and that other relationships can be achieved by selecting the appropriate design parameters.

Bearing this in mind, FIG. 3 shows bicycle rear wheel speed, that is the speed of the hub 57, as a function of pedal drive speed, both in revolutions per minute. In referring to FIG. 3, the speed ratio will be stated as the ratio of rear wheel speed divided by pedal drive speed. This is merely for convenience in order to permit the speed ratio parameter to be greater than unity and is the usual way speed ratio is depicted in connection with bicycle transmissions.

For purposes of analysis, assume that a fixed speed ratio through the chain 64 has been chosen at 1.5:1. In other words, the number of teeth on the front gear element 65 is 1:5 times the number of teeth on rear gear element 66. Assume also that the minimum ratio achievable through the variable speed ratio path is 1.385:1. It should be kept in mind that in order for the fixed ratio path to overrun the variable ratio path, the minimum speed ratio of the variable ratio path must be less than the fixed speed ratio. This is because the speed of the transmission 16 equals the pedal speed multiplied by the fixed speed ratio and divided by the minimum variable speed ratio. Therefore, in order for the speed of the transmission 16 to be greater than pedal speed, the fixed speed ratio divided by the minimum variable speed ratio must be greater than unity.

To continue with the analysis of FIG. 3, as the pedal speed increases, the speed of the pump 36 also increases through the combined transmission ratios of the variable and fixed speed paths. As the pump speed increases, the hydraulic pressure in line 49 also increases thereby increasing the pressure in actuator cylinders 51. At a selected design pressure, the force generated by the actuator pistons 52 on the thrust plate 55 is sufficient to overcome the counteracting force generated by the belt 20 and the disc 18 is moved toward disc 17 thereby forcing the belt 20 out to a greater diameter of engagement.

The increase in effective diameter of the transmission means 16 increases the speed ratio between transmission means 16 and 23 which in turn reduces the speed ratio multiplying factor for the reverse transmission from transmission means 23 to transmission means 16. This reduces the difference in speed between the transmission means 16 and the pedal shaft 12. To describe this phase of operation another way, the speed ratio of the variable ratio path is increasing from 1.385 and approaching the 1.5 ratio of the fixed ratio path.

It will be noted that as the speed ratio of the variable speed path exactly equals 1.5, the speed of the transmission means 16 will exactly equal the speed of the pedal shaft 12 because the multiplying factor of 1.5 through the fixed ratio path is cancelled by dividing by the 1.5 ratio through the variable speed path. At this point it might be said that the pedal speed has "caught up" with the speed of the transmission means 16. Now as the pedal speed is increased further, the speed ratio of the variable speed path becomes greater than 1.5 and the power transmission path shifts from the fixed ratio path to the variable ratio path. Under these conditions driving power is transmitted through the overrunning clutch 22 while clutch 70 overruns. In other words, the variable ratio path now overruns the fixed ratio path.

As noted above, the system switches to the variable ratio path at the point when the speed ratio of the variable ratio path has increased to equal that of the fixed ratio path. In the system shown in FIG. 3, this occurs at the point A at a pedal speed of approximately 65 RPM. From this point on, the system, now in the automatically variable ratio mode, will continuously adjust the speed ratio to hold the required pedal speed within the desired range. For the case shown in FIG. 3, the selected pedal speed range for normal operation is about 65 to 75 RPM for a nominal pedal speed of about 70 RPM, a relatively slow pace by most cycling standards.

As previously described, the system may be adjusted by manually changing the effective area of the orifice in valve 43 through the means of knob 46 and shaft 45. This adjustment changes the relationship between pump speed and actuating pressure in line 49 and therefore resets the speed range over which the variable ratio transmission path is operative.

It will be noted that the slope of the pedal speed to wheel speed line in FIG. 3 is quite steep. This is purposely selected as such because the average bicycle rider prefers to maintain a relatively constant pedal speed just as a steady cadence is normally preferred in walking or running.

The cadence pedalling speed range for the system depicted in FIG. 3 is that portion of the wheel speed versus pedal speed relationship between points A and B, which for the particular embodiment described, covers the range between 65 RPM and 75 RPM. At point B in FIG. 3, the system is at its maximum speed ratio producing, for the example given a speed ratio of about 3.5 to 1. For pedal speeds beyond this point the slope of pedal and wheel speed line is determined by the now fixed speed ratio of about 3.5.

If at any time the bicycle rider desires to discontinue pedaling and coast, the clutch 22 will allow the transmission to overrun the pedal shaft 12. Under these conditions, the transmission means 16 are driven through the belt 20 from the rear transmission means 23. At the same time, pump 36 is driven by gear element 37 so that the pressure output of the pump and the setting of the transmission speed ratio are maintained at the proper level even though the pedals are at standstill. In this connection it should be noted that references herein to pedal speed and pedal drive speed are intended to mean pedal speed in the operating mode and obviously do not apply to the coasting mode where the pedals are at rest. Incidentally, in the coasting mode it should be noted that clutch 70 also overruns.

As pointed out above, the system maintains its proper speed ratio setting in the coasting mode on the basis of the pedal drive speed which would have matched the particular bicycle speed if the pedals were being operated. This is an important feature of the invention because when the rider resumes pedaling, he will pick up the pedaling load at exactly the correct transmission speed ratio. Thus, the system automatically determines and sets the transmission speed ratio as a function of bicycle speed which is in turn related to pedal drive speed regardless of whether the pedals are actually being operated.

It should be noted here that the fixed speed ratio chain drive portion of the system is not an essential feature although it offers important advantages in very high starting torque applications. As will be apparent, the system will operate in the variable ratio mode without the fixed ratio chain portion of the system.

Alternative methods may be used to increase the torque transmitting capabilities of the variable ratio portion of the system. For example, the inner surfaces of the discs 17, 18, 24 and 25 which engage the belt 20 may be roughened or serrated to increase the coefficient of friction between the belt and the discs. With or without the application of such techniques, the system may be applied without the chain 64 in many systems, such as children's bicycles and the like, where high starting torques beyond the frictional capability of the system are not likely to be encountered. Or, the system may be applied in high torque applications without the chain 64 if some slipping of the belt can be tolerated.

Also, the first and second transmission means 16 and 23 and the interconnecting means formed by the belt 20 may take other forms. In this connection, it will be observed that various modifications and substitutions may be made in the embodiment of the invention presented herein without departing from the true scope and spirit of the invention as defined in the appended claims.

What we claim is:

1. A bicycle drive system in which operator driven pedals are connected to power a drive wheel comprising:
   first drive shaft means connected to be driven by the operator pedals;
   second drive shaft means connected to power the drive wheel of the bicycle;
   first transmission means driven by said first drive shaft means through overrunning device means allowing said first transmission means to be driven in one direction by operation of the pedals and to overrun the pedals in the opposite direction;
   second transmission means driving said second drive shaft means;

means interconnecting said first transmission means in driving relationship to said second transmission means;

control means for adjusting the speed ratio between said first and second transmission means through the path formed by said interconnecting means;

speed responsive means generating a signal as a function of pedal drive speed; and means responsive to said speed responsive signal to adjust said control means to regulate said speed ratio as a function of said pedal drive speed responsive signal to maintain said pedal drive speed substantially constant upon attainment of the predetermined cadence pedalling speed range.

2. A bicycle drive system as set forth in claim 1 including means for manually adjusting the level of said speed responsive signal as a function of pedal drive speed, thereby allowing the operator to adjust the relationship between pedal drive speed and the speed ratio between said first and second transmission means.

3. A bicycle drive system as set forth in claim 1 in which said speed responsive means comprises fluid pumping means producing a fluid pressure as a function of pedal drive speed.

4. A bicycle drive system as set forth in claim 3 in which said fluid pumping means is connected to a flow restricting orifice.

5. A bicycle drive system as set forth in claim 4 including means for manually adjusting the effective area of said flow restricting orifice, thereby allowing the operator to adjust the relationship between the speed at which said fluid pumping means is driven and the pressure produced thereby.

6. A bicycle drive system as set forth in claim 3 including means for limiting to a preselected maximum the level of the pressure produced by said fluid pumping means.

7. A bicycle drive system as set forth in claim 6 in which said pressure limiting means comprises pressure actuated bypass valve means.

8. A vehicle drive system comprising:
input drive shaft means through which input propulsion power is applied to said drive system;
output drive shaft means through which output propulsion power is extracted from said drive system to propel said vehicle;
first transmission means driven by said input drive shaft means;
second transmission means driving said output drive shaft means;
first interconnecting means forming a first power transmission path between said first and second transmission means;
control means for adjusting the speed ratio between said first and second transmission means through the path formed by said first interconnecting means;
speed responsive means generating a signal as a function of speed of said input drive shaft means;
means responsive to said speed responsive signal to adjust said control means to regulate said speed ratio thereof as a function of said speed proportional signal;
second interconnecting means forming a second power transmission path between said input drive shaft means and said output drive shaft means; said second interconnecting means having a fixed speed ratio; and means selectively operable to direct propulsion power through said second interconnecting means over a first range of vehicle speeds and to direct propulsion power through said first interconnecting means over a second range of vehicle speeds; whereby over said first vehicle speed range the speed ratio is constant, and over said second vehicle speed range said speed ratio is automatically adjusted in response to changes in the speed of said input drive shaft means to maintain said input drive shaft means at a substantially constant speed upon attainment of the predetermined cadence pedalling speed range.

9. A vehicle drive system as set forth in claim 8 including means for manually adjusting the level of said speed responsive signal, thereby allowing the operator to adjust over said second vehicle speed range the relationship between vehicle speed and said speed ratio.

10. A vehicle drive system as set forth in claim 8 in which said speed responsive means comprises fluid pumping means producing a fluid pressure as a function of the speed of said vehicle.

11. A vehicle drive system as set forth in claim 10 in which said fluid pumping means is connected to a flow restricting orifice.

12. A vehicle drive system as set forth in claim 11 including means for manually adjusting the effective area of said flow restricting orifice, thereby allowing the operator to adjust the relationship between the speed at which said fluid pumping means is driven and the pressure produced thereby.

13. A vehicle drive system as set forth in claim 10 including means for limiting to a preselected maximum the level of the pressure produced by said fluid pumping means.

14. A vehicle drive system as set forth in claim 13 in which said pressure limiting means comprises pressure actuated bypass valve means.

15. A bicycle drive system comprising:
input drive shaft means through which input propulsion power is applied to the drive system;
output drive shaft means through which output propulsion power is extracted from said drive system and applied to the drive wheel of said bicycle;
first transmission means driven by said input drive shaft means;
second transmission means driving said output drive shaft means;
an endless, flexible, power transmitting member connecting said first and second transmission means to transmit propulsion power therebetween; said first and second transmission means having cylindrical portions of adjustable diameter engaging said power transmitting member to form in each case the interface through which power is transmitted between said first and second transmission means and said power transmitting member;
speed responsive means generating a fluid pressure level as a function of the speed of said first transmission means; and
means responsive to said speed responsive fluid pressure level to adjust the diameter of engagement of at least one of said first and second transmission means with said power transmitting member to effect a corresponding adjustment in the speed ratio between said first and second transmission means responsive to changes in the speed of said first transmission means to maintain the speed of said first transmission means substantially constant upon attainment of the predetermined cadence pedalling speed range.

16. A bicycle drive system as set forth in claim 15 including means for manually adjusting the speed dependent characteristic of said speed responsive fluid pressure level, thereby allowing the operator to adjust the relationship between the speed of said first transmission means and said speed ratio between said first and second transmission means.

17. A bicycle drive system as set forth in claim 15 in which said speed responsive means comprises fluid pumping means connected to a flow restricting orifice.

18. A bicycle drive system as set forth in claim 17 including means for manually adjusting the effective area of said flow restricting orifice.

19. A bicycle drive system as set forth in claim 17 including means for limiting to a preselected maximum the level of the pressure produced by said fluid pumping means.

20. A bicycle drive system as set forth in claim 19 in which said pressure limiting means comprises pressure actuated bypass valve means for bypassing fluid flow around said flow restricting orifice.

21. A bicycle drive system as set forth in claim 15 including:
 a second endless power transmitting member connected in power transmitting relationship between a pair of fixed diameter transmission elements, said fixed diameter transmission elements being in turn connected respectively to said input and output drive shaft means; and
 means operable selectively to direct propulsion power through said second endless member over a first selected speed range and to direct propulsion power through said other endless member over a second speed range of said first transmission means; whereby over said first speed range the transmission speed ratio is a fixed speed ratio and over said second speed range the transmission speed ratio is automatically adjusted as a function of the speed of said first transmission means.

22. A bicycle drive system as set forth in claim 21 in which the minimum speed ratio achievable through the variable ratio path comprising said first and second transmission elements is greater than said fixed speed ratio.

* * * * *